United States Patent [19]
Poulson et al.

[11] Patent Number: 5,531,258
[45] Date of Patent: Jul. 2, 1996

[54] FOLDING SOFT GATE

[75] Inventors: Keith L. Poulson, Westminster; Paul Fair, Denver; Robert M. Parker, Aurora, all of Colo.

[73] Assignee: Gerry Baby Products Company, Thornton, Colo.

[21] Appl. No.: 276,948

[22] Filed: Jul. 19, 1994

[51] Int. Cl.$^6$ .............................. A47G 5/00; E06B 3/30; F16B 7/10

[52] U.S. Cl. .................. 160/376; 160/371; 160/378; 256/26; 256/DIG. 1; 49/57; 49/465; 49/505; 403/166; 403/235

[58] Field of Search ................... 160/372, 373, 160/374, 375, 376, 377, 378; 403/102, 109, 166, 326, 327, 329; 256/24, 26, 25, 31, 73, DIG. 1; 49/34, 54, 55, 57, 386, 384, 394, 397, 465, 503, 505

[56] References Cited

U.S. PATENT DOCUMENTS

| | | | |
|---|---|---|---|
| 281,964 | 7/1883 | Brent . | |
| 975,470 | 11/1910 | Shrady | 160/377 |
| 1,175,109 | 3/1916 | Anderson . | |
| 1,325,519 | 12/1919 | Jenkins . | |
| 1,662,586 | 3/1928 | Newman . | |
| 1,964,332 | 6/1934 | Rembaum | 156/14 |
| 2,225,963 | 7/1939 | Augustine | 160/373 X |
| 2,357,819 | 6/1940 | Greer | 160/377 X |
| 2,793,050 | 5/1957 | Cook | 280/150 |
| 3,583,466 | 6/1971 | Dreyer | 160/351 |
| 4,103,445 | 8/1978 | Smith et al. | 40/125 G |
| 4,124,322 | 11/1978 | Parisien | 403/295 |
| 4,431,331 | 2/1984 | Brody | 403/329 X |
| 4,492,263 | 1/1985 | Gebhard | 160/228 |
| 4,787,174 | 11/1988 | Brown | 49/55 |
| 4,944,117 | 7/1990 | Gebhard et al. | 49/55 |
| 5,113,611 | 5/1992 | Rosson | 38/102.7 |
| 5,272,840 | 12/1993 | Knoedler et al. | 49/463 |
| 5,293,656 | 3/1994 | Chan | 403/102 X |

FOREIGN PATENT DOCUMENTS

| | | |
|---|---|---|
| 651926 | 4/1951 | United Kingdom . |
| WO93/07352 | 4/1993 | WIPO . |

*Primary Examiner*—Blair Johnson
*Assistant Examiner*—Bruce A. Lev
*Attorney, Agent, or Firm*—Biebel & French

[57] ABSTRACT

A security gate for positioning within an area way such as a doorway. The gate includes a support structure defined by a frame and a flexible panel supported by the frame. The frame includes horizontal members and vertical members wherein the vertical members may be conveniently folded to a position parallel to the horizontal members whereby the gate is folded to a compact configuration for transportation or storage.

10 Claims, 8 Drawing Sheets

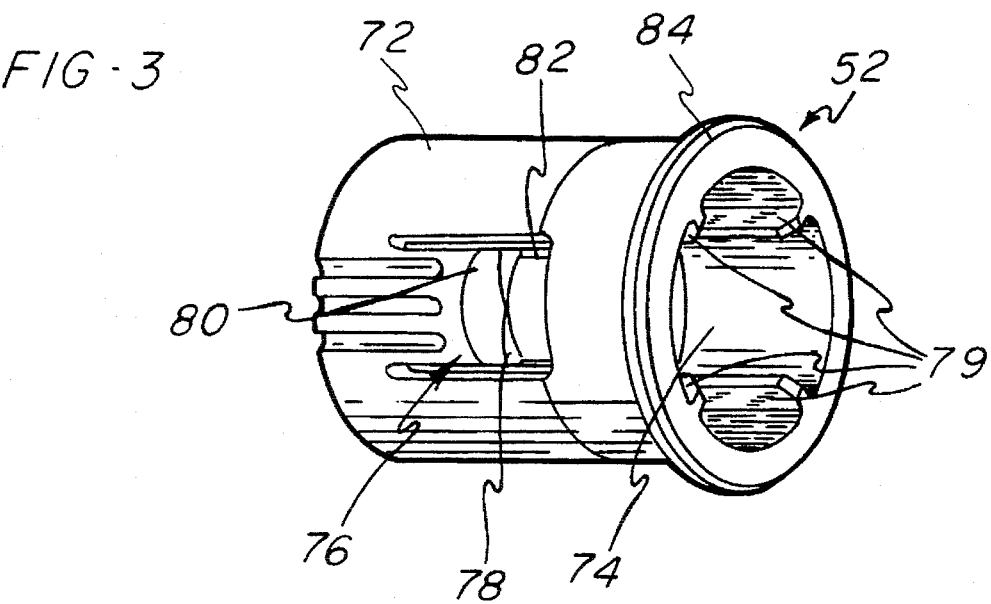
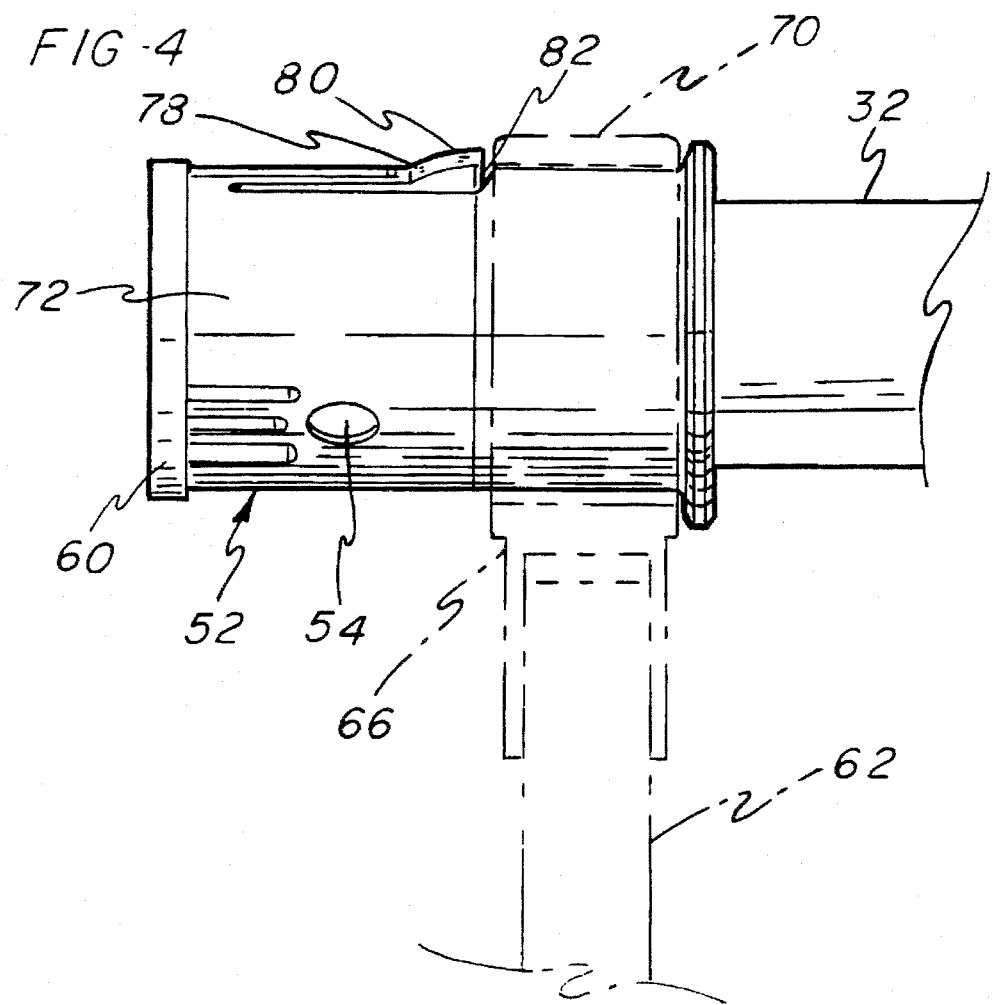

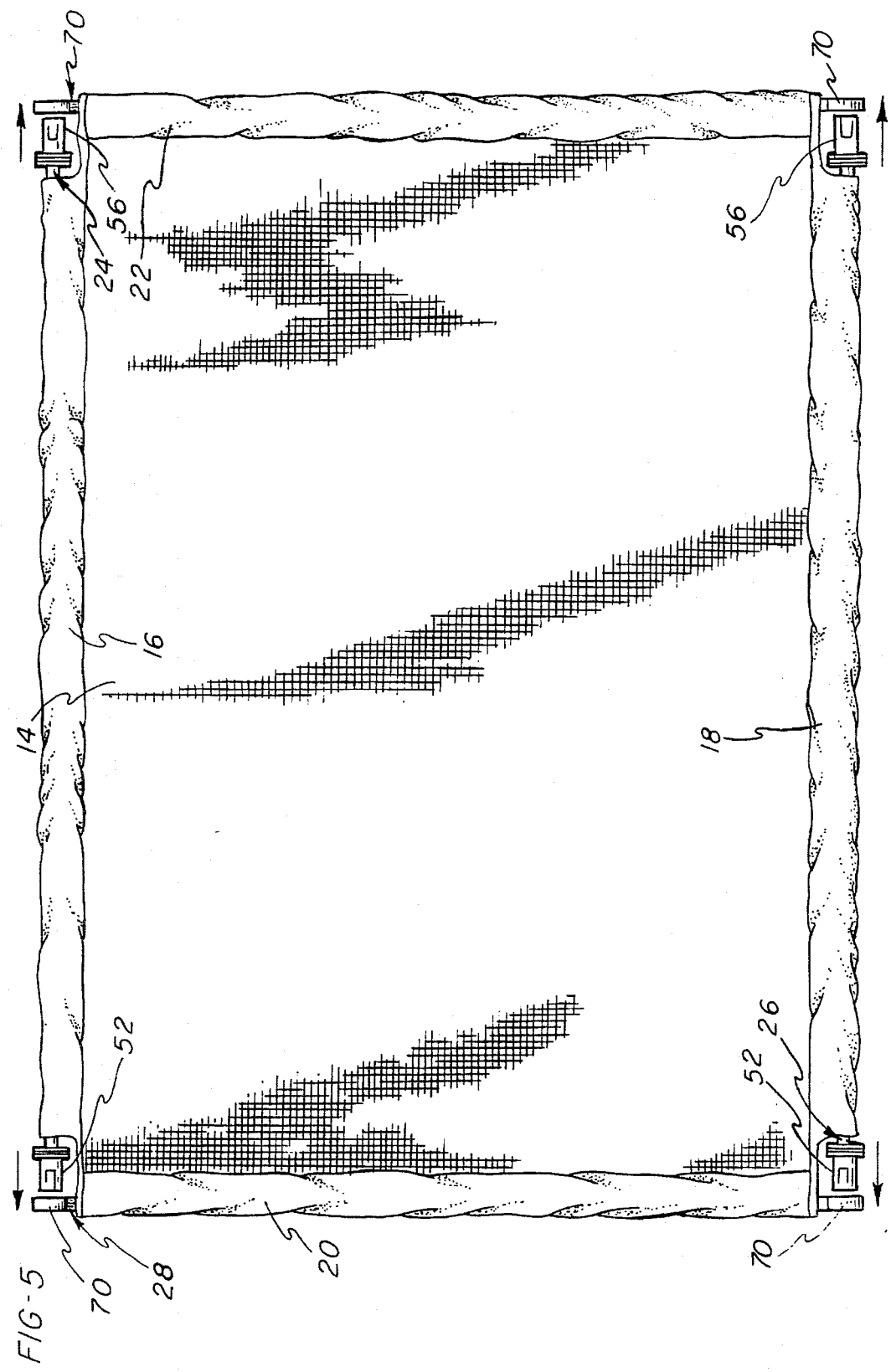

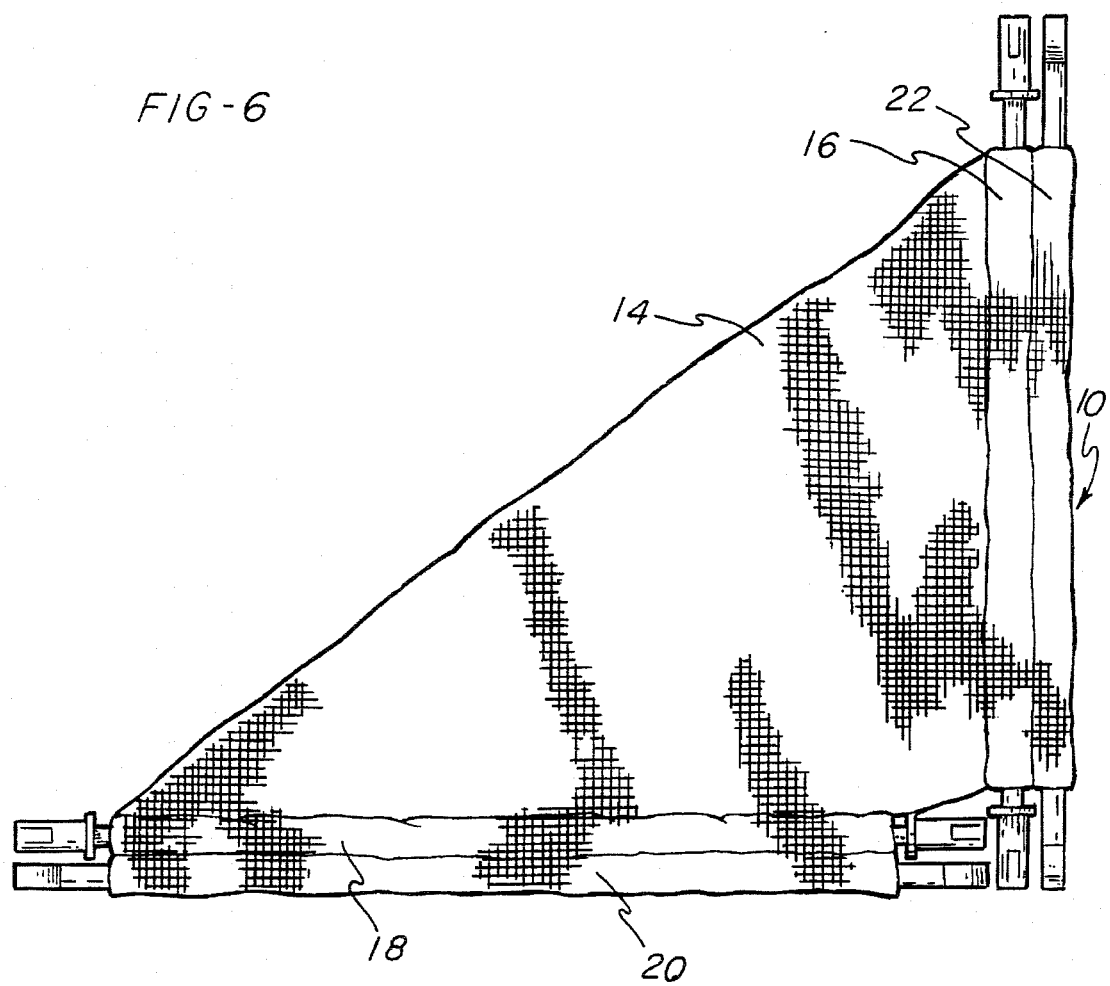
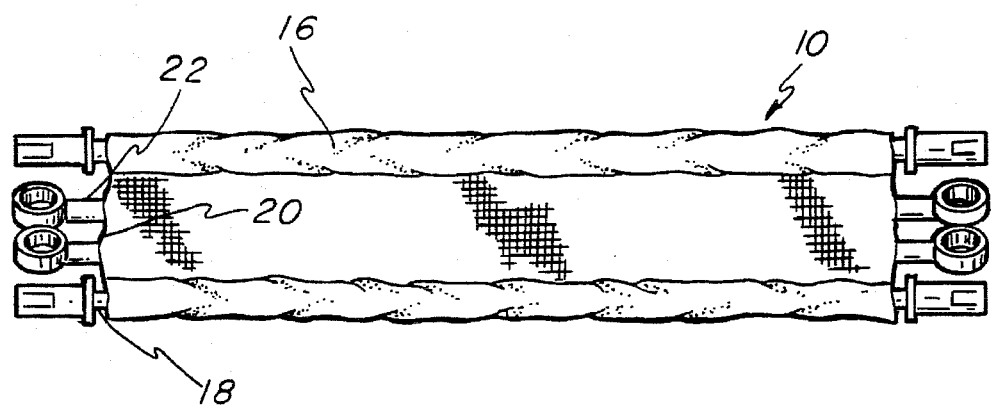

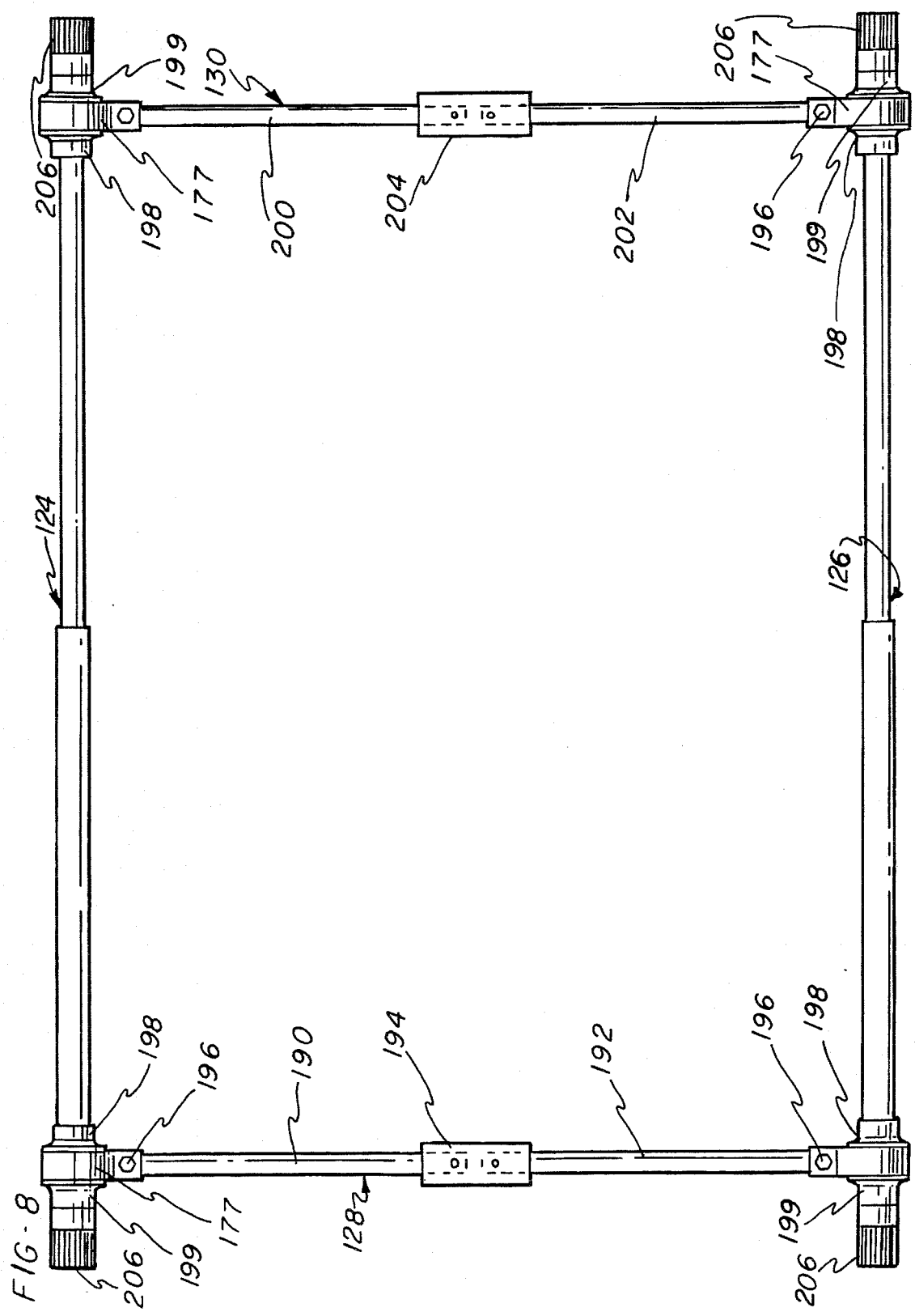

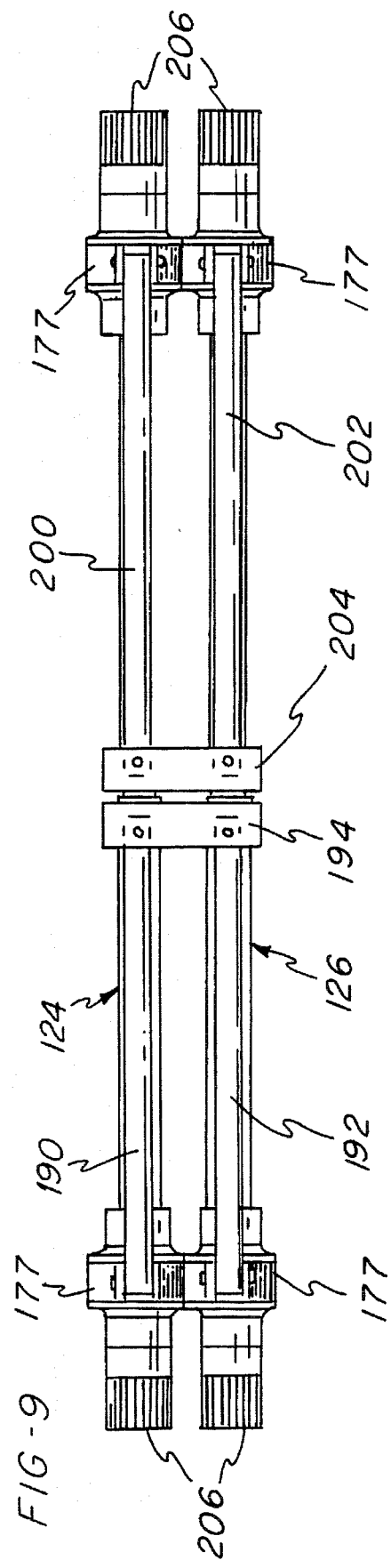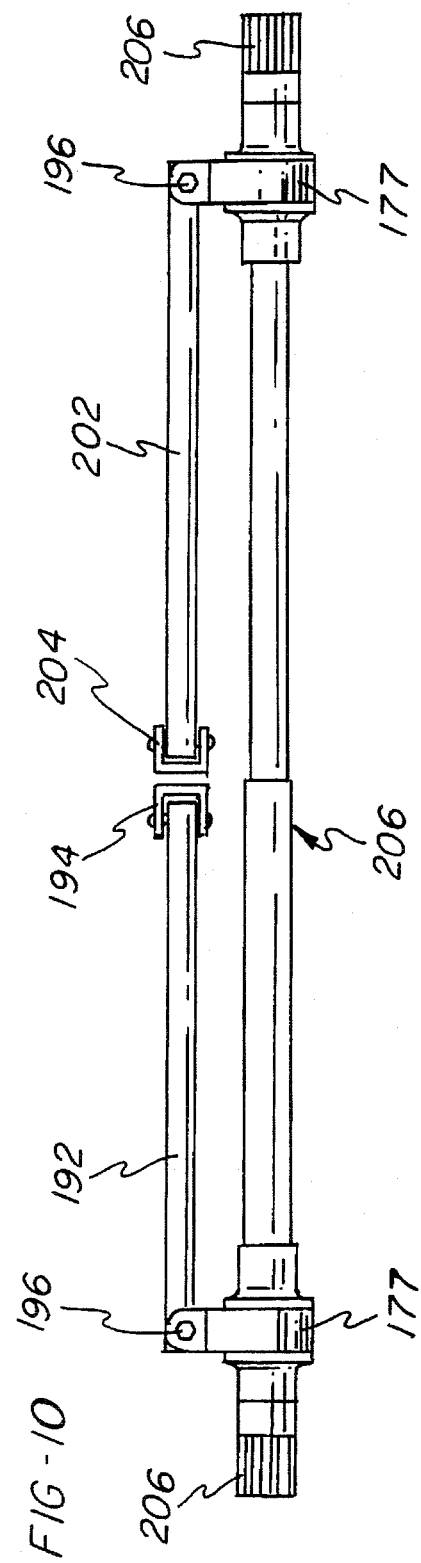

FOLDING SOFT GATE

BACKGROUND OF THE INVENTION

The present invention relates to a closure device for placement in a doorway and, in particular, to a door gate which may be frictionally engaged with a doorway for preventing infants or small children from passing through the doorway.

In environments where small children or infants are present, it is generally desirable to have a closure device or gate which may be removably placed within an area way, such as a doorway, to prevent passage therethrough. For example, it may be desirable to restrict small children to a particular room without shutting the door to the room such that one can look into the room or the children can see an adult nearby.

Various means and techniques have been devised for the formation of barriers or closures across area ways wherein the gate may be removably mounted within the area way and which typically include means for adjusting the width of the gate to accommodate different distances between the side portions of the area way. For example, Gebhardt U.S. Pat. No. 4,492,263 discloses an infant security door gate assembly which includes upper and lower support bars incorporating coil springs positioned within telescoping tubes to form a compression friction fit within the doorway. In addition, the gate of Gebhardt is formed of a pair of complementary overlapping panels.

Gebhardt et al. U.S. Pat. No. 4,944,117 and Knoedler et al U.S. Pat. No. 5,272,840 disclose security gate constructions which include overlapping substantially rigid panels which may be adjusted relative to each other to provide for a width adjustment.

While the above-described gates are satisfactory for preventing passage of an infant or small child through a doorway, there is a need for a security gate which is adapted to be mounted within an area way, such as a doorway, and which is additionally capable of being placed in a compact configuration for convenient storage and/or transportation of the security gate.

SUMMARY OF THE INVENTION

In accordance with the present invention, a novel and improved security gate has been devised which forms a releasable closure adapted for disposition between spaced, confronting sides of an area way such as, a doorway, and which is conveniently folded to a compact form.

It is a general object of the present invention to provide such a releasable closure comprising a support structure for spanning across an area way, the support structure including at least one horizontal member for extending between and engaging the sides of the area way, and the support structure further including at least one vertical member for extending from the horizontal member toward a floor surface. A fabric panel is also provided supported by the support structure for preventing passage through the area way.

It is another general object of the invention to provide a releasable closure comprising at least one horizontal member having opposing ends and engagement members located at the opposing ends for engaging the sides of an area way. An adjustment mechanism is provided for adjustment of the spacing between the ends of the engagement members and a flexible panel is supported by the horizontal member and is adapted to flex to accommodate different spacings between the engagement members.

It is a further general object of the invention to provide a releasable closure comprising an upper horizontal member having opposing first and second ends for engaging the sides of an area way, a lower horizontal member having opposing first and second ends for engaging the sides of the area way, a first vertical member extending between the first end of the upper horizontal member and the first end of the lower horizontal member and a second vertical member extending between the second end of the upper horizontal member and the second end of the lower horizontal member. In addition, a flexible panel is provided fastened to the horizontal and vertical members.

In a specific embodiment of the present invention, a releasable closure is provided which is adapted for disposition between spaced, confronting sides of an area way, the closure comprising upper and lower tubular members which are adapted to be disposed horizontally in a doorway spaced relation to each other. The tubular members are preferably each formed of two telescoping tubes having engagement surfaces defined by contact pads at the outer ends of the tubes. In addition, the tubes are biased apart by an internal spring wherein at least one of the tubes may be threaded along the spring by rotating the tube whereby the tubular members may be adjusted to accommodate different doorway widths.

Side members are provided extending perpendicular to the horizontal tubular members whereby the side members define vertical members for maintaining the vertical spacing between the horizontal members.

The ends of the horizontal members are provided with end caps to which the contact pads are mounted and the end caps each include a resilient catch mechanism. The ends of the vertical members are provided with rings for passage over the contact pad and end cap, and the rings are retained in engagement on the end caps by the catch mechanisms whereby the vertical members are maintained in mounted relationship to the horizontal members.

A panel is provided formed of a flexible flaccid or fabric material and includes top, bottom and side hem portions defining tubular areas for receiving the horizontal and vertical members. When it is desired to fold the gate into a compact configuration, the catch mechanisms on the horizontal members are released such that the vertical members are free of the horizontal members, and the vertical members are then moved into parallel relationship relative to the horizontal members.

In another embodiment of the present invention, the vertical members are permanently mounted to the ends of the horizontal members at pivot points attached to the horizontal members. In addition, the vertical members are each formed by two bars pivotally connected to each other at a central portion of the vertical member. Thus, the releasable closure for this embodiment may be folded by collapsing the vertical members laterally inwardly to permit the horizontal members to move toward each other in a compact configuration with the horizontal and vertical members parallel to each other.

Other objects and advantages of the invention will be apparent from the following description, the accompanying drawings and the appended claims.

BRIEF DESCRIPTION OF THE DRAWINGS

FIG. 3 is a perspective view showing the detail of an end cap for the gate;

FIG. 4 is an elevational view of the end cap;

FIGS. 5–7 illustrate a folding operation for positioning the gate in a compact configuration;

FIG. 8 is a front elevational view showing an alternative embodiment for the frame portion of the gate;

FIG. 9 is a plan view showing the gate of FIG. 8 in a folded configuration;

FIG. 10 is a side elevational view of the folded gate shown in FIG. 9;

DETAILED DESCRIPTION OF THE PREFERRED EMBODIMENT

Figure 1:
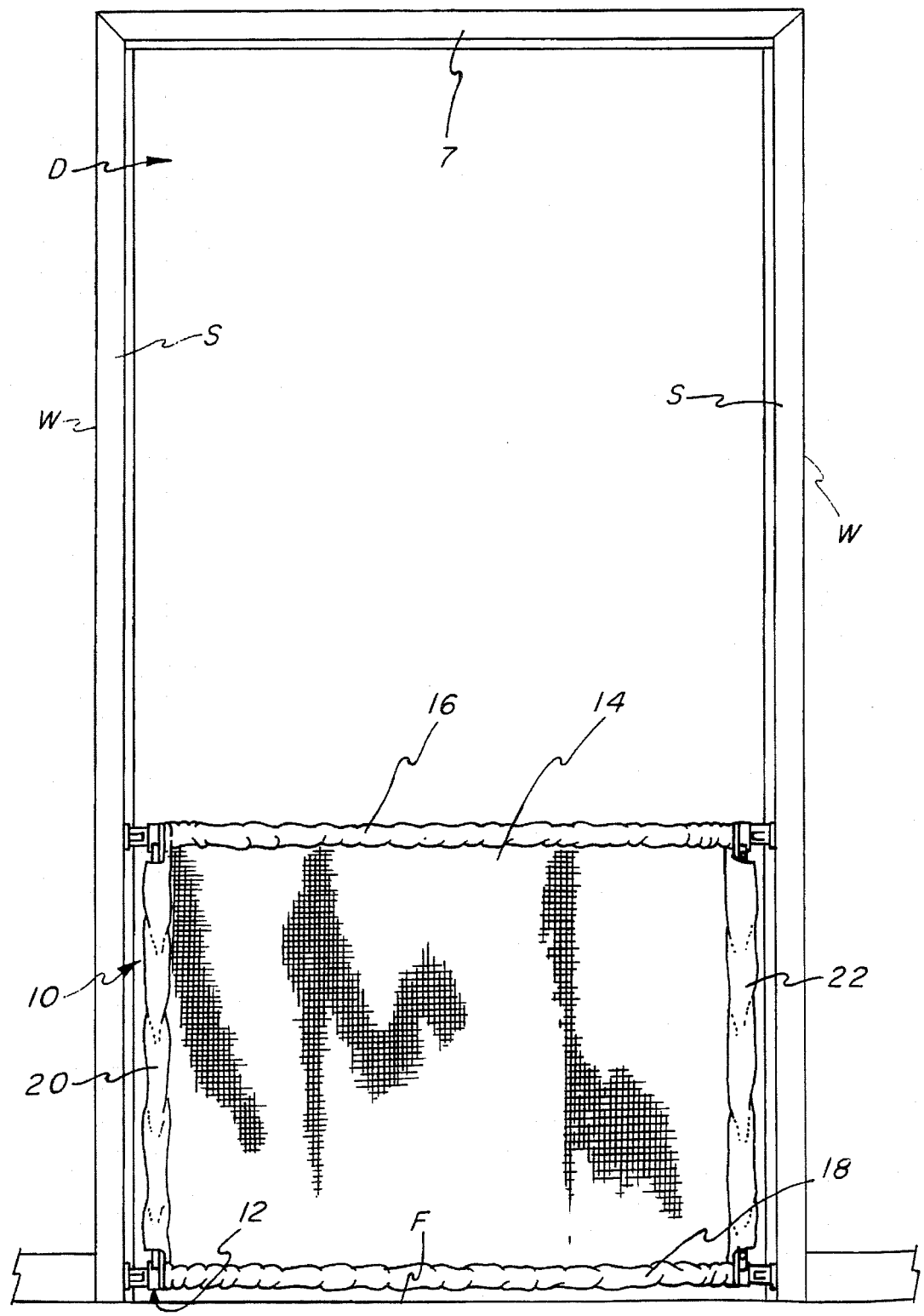
FIG. 1 is a front elevational view of the security gate for the present invention installed between opposed confronting vertical surfaces of a doorway.

Referring to FIG. 1, the assembly and installation of a preferred form of the security gate assembly 10 of the present invention is shown extending across an area way, such as a doorway, represented at D. The doorway may generally be characterized as having vertical side edges S at the edges of wall surfaces W which form doorjambs on opposite sides of the doorway D together with an upper or top edge T and a lower floor surface represented at F.

The gate assembly 10 includes a support structure formed by a frame 12 (see FIG. 2) supporting a flexible panel 14 formed of a flaccid fabric material. The panel 14 is preferably formed with a central area formed of a mesh netting type material, although other flaccid fabrics or materials may be used. In addition, the gate assembly 10 defines upper and lower horizontal portions 16 and 18 and opposing first and second vertical side portions 20 and 22 extending between the upper and lower portions 16, 18.

Figure 2:
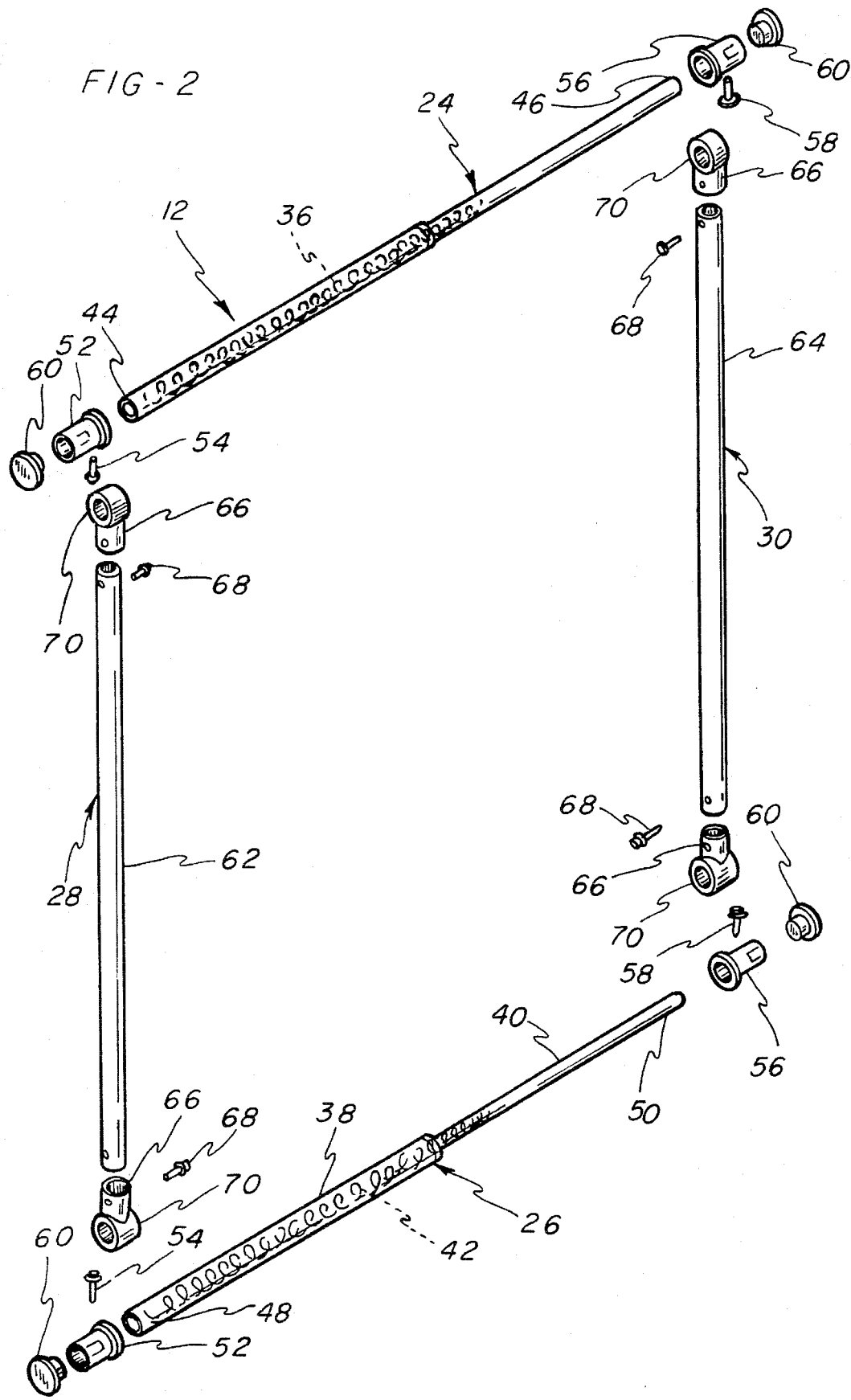
FIG. 2 is an exploded perspective view of the frame for the gate.

Referring to FIG. 2, the frame 12 for the gate assembly includes an upper horizontal member 24, a lower horizontal member 26, a first vertical member 28 and a second vertical member 30. The upper horizontal member includes a pair of tubes 32, 34 located in telescoping relationship to each other and biased outwardly from each other by a compression spring 36. Similarly, the lower horizontal member includes a pair of telescoping tubes 38 and 40 which are biased outwardly from each other by a compression spring 42.

The upper horizontal member 24 includes opposing first and second ends 44 and 46, and the lower horizontal member 26 includes opposing first and second ends 48 and 50. The first ends 44 and 48 receive end caps 52 which are held in place on the ends 44, 48 by fastener means in the form of pins 54. Similarly, the second ends 46 and 50 are provided with end caps 56 which are held in place by means of pins 58. Contact pads 60 are mounted to the ends of the end caps 52 and 56 and form contact surfaces for engaging the vertical side edges S of a doorjamb.

It should be noted that the length of the upper and lower horizontal members 24 and 26 is adjustable by rotating the tubes 32, 34 and 38, 40 relative to each other. The construction of the upper and lower horizontal members 24, 26 is similar to that disclosed in U.S. Pat. No. 4,492,263, assigned to the assignee of the present invention, and incorporated herein by reference.

The vertical members 28, 30 comprise respective tubular bars 62 and 64 wherein a pair of end portions 66 are attached to each of the bars 62 and 64 by fastening means such as pins 68. Each of the end portions 66 includes a ring portion 70 which is adapted to pass over the contact pads 60 and end caps 52 and 56 whereby the first and second vertical members 28 and 30 are adapted to be mounted to the first and second ends 44, 48 and 46, 50, respectively, of the upper and lower horizontal members 24, 26.

Referring to FIGS. 3 and 4, one of the end caps 52 is illustrated wherein the other end cap 56 has an identical construction. The end cap 52 comprises a cylindrical body 72 having an aperture 74 therethrough for receiving an end of a tube for one of the horizontal members 24, 26. The end cap 52 further includes a catch formed by a tongue 76 formed integrally with the body 72 and the body 72 and tongue 76 are preferably formed of a resilient material such as plastic whereby the tongue 76 is adapted to resiliently move radially inwardly and outwardly relative to a longitudinal axis of the end cap 52. The tongue 76 includes an upwardly projecting tang 78 including a tapered surface 80 and a stop surface 82. In addition, interior ribs 79 are provided inside the cylindrical body 72 to thereby maintain the body 72 in spaced relation to the tube 24, 28 to which it is mounted. Thus, a clearance space is provided for accomodating movement of the tongue 78 into the body 72.

In use, a ring 70 of the end portion 66 for one of the vertical members 28, 30 may be slidably positioned over the tapered surface 80 past the tang 78 against a collar 84 of the end cap 52, and will be retained in this position by the stop surface 82 preventing removal of the ring 70. When it is desired to displace the rings 70 from the end caps 52 and 56, the catch 76 may be depressed to thereby provide clearance for the ring 70 to pass over the surface 80 and off of the end cap 52.

FIGS. 5–7 illustrate a series of steps for folding the gate assembly 10 into a compact configuration. As seen in FIG. 5, an initial step for folding the gate 10 includes detaching the vertical members 28, 30 from the horizontal members 24, 26. It should be noted that the upper portion 16, lower portion 18, first side portion 20 and second side portion 22 include tubular hem portions of the panel 14 which are also formed of a flexible or flaccid fabric material and which extend around respective frame members 24, 26, 28 and 30. Thus, the frame 12 is substantially permanently attached to the panel 14 throughout the folding operation, as described further below.

As seen in FIG. 6, the upper portion 16 is moved into parallel relationship with the second side portion 22 and, simultaneously, the first side portion 20 is moved into parallel relationship relative to the bottom portion 18 whereby end portions of the upper and second side portions 16, 22 are adjacent to end portions of the lower and first side portions 18, 20. Subsequently, ends of the upper and side portions 16, 22 distal from the lower and side portions 18, 20 are rotated or pivoted toward the lower and side portions 18, 20 whereby the upper, lower and side portions 16, 18, 20, 22 are located in parallel relationship to each other, as seen in FIG. 7. With the gate assembly 10 in the compact configuration shown in FIG. 7, the gate 10 may be easily transported and/or placed within an elongated storage bag (not shown) to facilitate handling and storage of the gate 10.

From the above description it should be apparent that by providing the present construction for a security gate including a flexible central panel 14 attached to a supporting frame structure 12, the panel 14 will readily adapt to different doorway widths as the support members 24 and 26 are adjusted. In addition, the present construction also provides a security gate which is readily folded into a compact configuration.

Referring to FIG. 8, an alternative embodiment of the present invention is illustrated wherein the flexible panel has been removed to show the underlying frame. The frame for this embodiment includes upper and lower horizontal support members 124 and 126 comprised of telescoping tubes having substantially the same construction as in the previous embodiment. In addition, vertical side members 128 and 130 are provided wherein the upper, lower and side members 124, 126, 128 and 130 are adapted to support a fabric panel (not shown) which is of substantially the same construction as the panel 14 of the previous embodiment.

The vertical member 128 is comprised of a pair of bars 190 and 192 which are connected to each other through a connector or central joint 194 wherein the bar 190 and 192 are pivotally mounted to the joint 194. In addition, the bar 190 is mounted at a pivot joint 196 to a ring 177 which is retained on a first end of the horizontal member 124 by retaining collars 198, 199 and the other bar 192 is connected to a ring 177 at a pivot joint 196 wherein the ring 177 is retained on a first end of the horizontal member 126 by collars 198, 199.

The second vertical member 130 has a construction similar to that of the first vertical member 128 and includes a pair of bars 200, 202 pivotally mounted to a connector 204 or central joint, and pivotally mounted to respective rings 177 at pivot joints 196 wherein the rings 177 are retained on second ends of the horizontal members 124 and 126 by collars 198, 199. It should be noted that the collar 199 is preferably formed on an inner end of contact pads 206 located on the ends of the horizontal members 124 and 126.

As seen in FIGS. 9 and 10, the present embodiment for the frame may be folded by moving the connectors 194 and 204 toward each other whereby the vertical bars 190, 192, 200, 202 are pivoted to a position which is parallel to the horizontal members 124 and 126. It should be understood that although not shown, a panel similar to the panel of the previous embodiment is provided to the frame of the embodiment of FIGS. 8–10 and will be folded with the frame member to the compact configuration shown in FIGS. 9 and 10.

Figure 11:
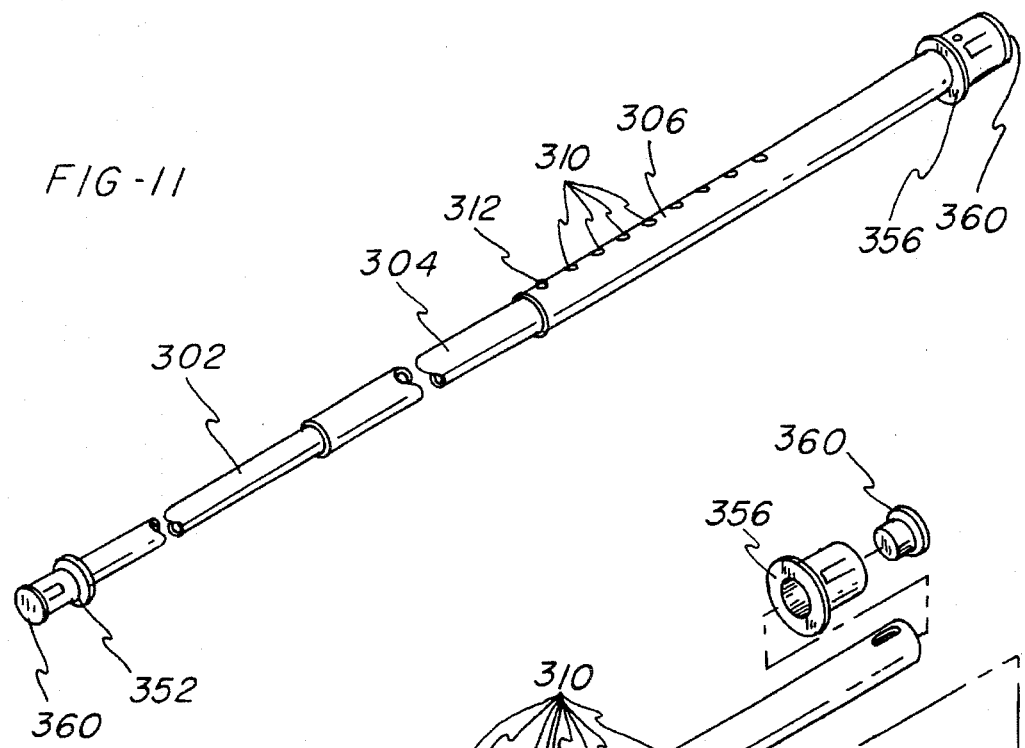
FIG. 11 is a perspective view of an alternative embodiment for the horizontal tubes for permitting the gate of the present invention to be expanded to a 60 inch width.
Figure 12:
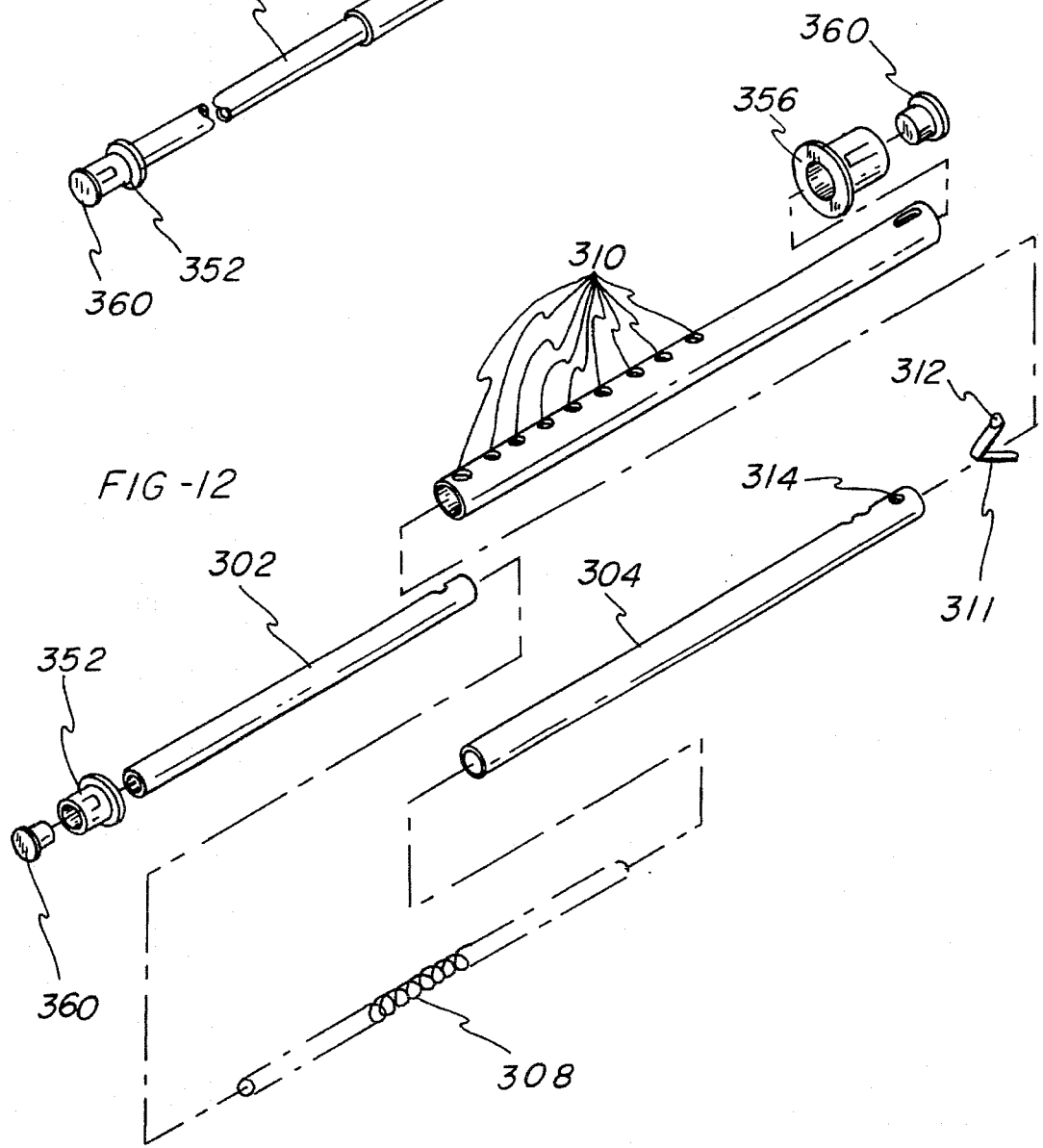
FIG. 12 is an exploded perspective view of the horizontal member shown in FIG. 11.

Referring to FIG. 11 and 12, an alternative construction for the horizontal members is shown wherein the horizontal member shown includes three telescoping tubes. A first end tube 302 and middle tube 304 are biased outwardly from each other by a spring 308, and the tubes 302 and 304 are adjustable relative to each other in a manner similar to the horizontal assemblies described above.

A second end tube 306 is adjustable along the middle tube 304 to a plurality of predetermined positions. The tube 306 includes a plurality of holes 310 defining the predetermined positions. A resilient metal catch 311 is located within the tube 304 and includes a detent 312 which extends through a hole 314 in the tube 304 and which is adapted to be selectively positioned in one of the holes 310 whereby the position of the tube 306 relative to the tube 304 is determined. In addition, the end tubes 302, 304 are shown provided with end cups 352 and 356 and contact pads 360 similar to those disclosed for the first embodiment. The present construction for the horizontal members provides an adjustable tube assembly which may be expanded from a 30" length up to approximately a 60" length. Further, it should be noted that the present horizontal tube assembly may be incorporated into both of the above-described embodiments for the gate.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A releasable closure adaptable for disposition between spaced, confronting sides of an area way, said releasable closure comprising:

an upper horizontal member having opposing first and second ends for engaging the sides of said area way;

a lower horizontal member having opposing first and second ends for engaging the sides of said area way;

a first vertical member extending between said first end of said upper horizontal member and said first end of said lower horizontal member, said first vertical member including upper and lower ends;

a second vertical member extending between said second end of said upper horizontal member and said second end of said lower horizontal member, said second vertical member including upper and lower ends;

a ring portion located at each of said upper and lower ends of said first and second vertical members wherein said ring portions are located extending around said upper and lower members with said ends of said upper and lower horizontal members extending through said ring portions for engaging the sides of said area way; and a flexible panel fastened to said horizontal and vertical members.

2. The releasable closure as recited in claim 1 wherein said ends of said horizontal members are biased outwardly into engagement with said area way.

3. The releasable closure as recited in claim 2 wherein said upper and lower horizontal members each include a pair of telescoping tubes engaged in telescoping relation with each other, and said telescoping tubes each include an end defining one of said first and second ends for engaging the sides of said area way.

4. The releasable closure as recited in claim 1 including a catch located at each of said ends of said horizontal members and said ring portions releasably engage said catches.

5. The releasable closure as recited in claim 1 including a pivot located at each of said ends of said horizontal members wherein said ends of said vertical members are pivotally mounted to said horizontal members at said pivots.

6. The releasable closure as recited in claim 5 wherein each of said vertical members comprise a pair of bars connected to each other at a pivot connection whereby the bars of each of said vertical members are mounted for pivotal movement relative to each other.

7. The releasable closure as recited in claim 1 wherein said horizontal member comprises a first end tube, a middle tube and a second tube, said first end tube extending in telescoping relationship within said middle tube and said middle tube extending in telescoping relationship within said second end tube.

8. The releasable closure as recited in claim 7 including spring biasing means for biasing said first end tube out of said middle tube, and catch means for locking said second end tube at a plurality of locations of extension relative to said middle tube.

9. The releasable closure as recited in claim 1 wherein said vertical members are movable to a folded position extending parallel to said horizontal members.

10. The releasable closure as recited in claim 1 wherein said horizontal members are movably engaged with said ring portions whereby said horizontal members are rotatable within said ring portions.

* * * * *